US008030391B2

(12) United States Patent
Petri et al.

(10) Patent No.: US 8,030,391 B2
(45) Date of Patent: Oct. 4, 2011

(54) AQUEOUS PLASTIC DISPERSIONS, METHOD FOR PRODUCING THE SAME AND THEIR USE

(75) Inventors: Harald Petri, Arbergen (DE); Ivan Cabrera, Dreieich (DE)

(73) Assignee: Celanese Emulsions GmbH, Kronberg (DE)

( * ) Notice: Subject to any disclaimer, the term of this patent is extended or adjusted under 35 U.S.C. 154(b) by 356 days.

(21) Appl. No.: 11/994,881

(22) PCT Filed: Jun. 27, 2006

(86) PCT No.: PCT/EP2006/006173
§ 371 (c)(1),
(2), (4) Date: Jul. 11, 2008

(87) PCT Pub. No.: WO2007/006413
PCT Pub. Date: Jan. 18, 2007

(65) Prior Publication Data
US 2009/0203814 A1    Aug. 13, 2009

(30) Foreign Application Priority Data

Jul. 9, 2005  (DE) .......................... 10 2005 032 194

(51) Int. Cl.
| C08J 3/02 | (2006.01) |
| C08J 5/18 | (2006.01) |
| C08K 7/10 | (2006.01) |
| C08K 7/08 | (2006.01) |
| C08K 5/05 | (2006.01) |
| C08K 5/09 | (2006.01) |
| C08K 5/15 | (2006.01) |
| C08K 5/45 | (2006.01) |

(52) U.S. Cl. ........ 524/457; 524/367; 524/523; 524/806; 524/69; 524/37; 524/724; 524/110; 524/157; 524/160; 524/804; 524/261; 524/553; 524/554; 524/315; 524/366; 524/379; 524/414; 524/417; 524/458; 524/459; 524/460; 524/503; 524/524; 524/563; 524/745; 524/767; 524/831; 524/858; 524/860; 524/803; 524/807; 525/56; 525/330.3; 525/342; 525/383

(58) Field of Classification Search .................. 524/804, 524/157, 457, 367, 523, 806, 69, 37, 724, 524/110, 160, 261, 553, 554, 315, 366, 379, 524/414, 417, 458, 459, 460, 503, 524, 563, 524/745, 767, 831, 858, 860, 807, 803; 525/56, 525/330.3, 342, 383
See application file for complete search history.

(56) References Cited

U.S. PATENT DOCUMENTS

| 3,644,262 | A | 2/1972 | Stehle et al. |
| 4,269,749 | A | 5/1981 | Marriott et al. |
| 4,999,218 | A | 3/1991 | Rehmer et al. |
| 5,047,295 | A | 9/1991 | Dotzauer et al. |
| 5,073,578 | A | 12/1991 | Boodaghains et al. |
| 5,162,415 | A | 11/1992 | Rehmer et al. |
| 5,614,049 | A | 3/1997 | Kohlhammer et al. |
| 5,744,418 | A | 4/1998 | Jakob |
| 6,093,766 | A | 7/2000 | Jakob et al. |
| 6,667,352 | B1 | 12/2003 | Kusters et al. |
| 6,710,113 | B2 | 3/2004 | Weitzel |
| 6,790,272 | B1 | 9/2004 | Zhao et al. |
| 7,078,455 | B2 | 7/2006 | Heldmann et al. |
| 2004/0077782 | A1* | 4/2004 | Heldmann et al. ............ 524/804 |

FOREIGN PATENT DOCUMENTS

| DE | 3827975 A1 | 3/1990 |
| DE | 3901073 A1 | 7/1990 |
| DE | 4431343 A1 | 4/1996 |
| DE | 19739936 A1 | 3/1999 |
| DE | 19811314 A1 | 9/1999 |
| DE | 19853461 A1 | 5/2000 |
| DE | 10112431 A1 | 10/2002 |
| EP | 0256391 A2 | 2/1988 |
| EP | 0256391 A3 | 2/1988 |
| EP | 0347760 B1 | 12/1989 |
| EP | 0417568 A2 | 3/1991 |
| EP | 0417568 A3 | 3/1991 |
| EP | 0444827 A1 | 9/1991 |
| EP | 0609756 A2 | 8/1994 |
| EP | 0609756 A3 | 8/1994 |
| EP | 0778290 A2 | 6/1997 |
| EP | 0778290 A3 | 6/1997 |
| EP | 1018535 A1 | 7/2000 |
| EP | 1174447 A1 | 1/2002 |
| WO | WO 02 074856 A2 | 9/2002 |
| WO | WO 02 074856 A3 | 9/2002 |

OTHER PUBLICATIONS

Dimonie et al., "Control of Particle Morphology," *Emulsion Polymerization and Emulsion Polymer*, Edited by Peter A. Lovell and Mohamed S. El-Aasser, pp. 294-326.
Robert G. Gilber, "Emulsion Polymerization—A Mechanistic Approach," *Academic Press*, pp. 15-18.
Jönsson et al., "Polymerization Conditions and the Develop: Morphology in PMMA/PS Latex Particles. Initiator Properties and Mode of Monomer," *American Chemical Society*, Macromolecules, vol. 27, No. 7, pp. 1932-1937.
Yu et al., "Study of Particle Morphology in Polymer Emulsions and Their Minimum Film Formation Temperatures," *Journal of Applied Polymer Science*, vol. 41, 1990, pp. 1965-1972.
Search Report for PCT/EP2006/006173 dated Oct. 20, 2006, 4 pages.
Translation of International Preliminary Report on Patentability dated Jun. 12, 2008, 6 pages.

* cited by examiner

*Primary Examiner* — Rabon Sergent
*Assistant Examiner* — Deve E Valdez
(74) *Attorney, Agent, or Firm* — Dority & Manning, P.A.

(57) ABSTRACT

Multistage polymers predominantly stabilized by nonionic emulsifiers and derived from hard and soft monomer compositions containing vinyl esters, of which at least one monomer composition must contain an unsaturated compromisable organosilicon compound, are described.
The plastic dispersions can be used as binders in emulsion paints and finishes and impart to these excellent scrub resistance in addition to good blocking resistance.

30 Claims, No Drawings

AQUEOUS PLASTIC DISPERSIONS, METHOD FOR PRODUCING THE SAME AND THEIR USE

The present invention relates to aqueous plastic dispersions based on vinyl ester copolymers which are substantially stabilized by nonionic components, methods for producing the same and their use.

Plastic dispersions are used as binders for the preparation of both pigmented and unpigmented, aqueous formulations which are used, for example, as coating materials. The pigmented coating materials include in particular glazes, emulsion finishes, emulsion paints, synthetic resin-bound renders, sealing compounds and filling compounds, which are widely used both in the protection of buildings and in the decorative sector. The unpigmented coating materials include, for example, clear finishes. Moreover, plastic dispersions are the main component of water-based food coatings which are intended to protect the substrate from drying out and harmful environmental influences.

Coating compositions must meet a multiplicity of practical requirements, for example sufficient blocking resistance of the dried coatings and sufficient stability of the coatings to abrasive stress, in addition to good processability of the aqueous formulations even at low processing temperatures.

In the case of binder-rich coating compositions (low pigment volume concentration "PVC") whose surfaces are characterized by a high proportion of polymeric binder, gloss properties of dried coatings are also of primary importance apart from the blocking resistance and abrasion resistance.

These requirements with respect to coating compositions is taken into account in the prior art by different formulation approaches.

Some of these approaches include the use of organic solvents and/or plasticizers. The liberation of volatile, organic constituents is, however, undesired owing to their harmful effect on man and the environment, in particular in applications in interior rooms.

There therefore was and is a considerable need for aqueous plastic dispersions which make it possible to formulate plasticizer- and solvent-free coating systems having high binder contents (low PVC) or having low binder contents (high PVC) and a low film formation temperature, which meet the requirements with regard to blocking resistance, gloss properties and abrasion properties.

DE-A-198 11 314 discloses multistage acrylic ester dispersions which contain itaconic acid as an acidic comonomer and are preferably prepared using anionic emulsifiers or using mixtures of anionic and nonionic emulsifiers as stabilizers. The binders described have advantageous wet abrasion resistances and blocking resistances, but only in plasticizer-containing paint formulations having a low PVC of 46.9%.

EP-A-0 347 760 recommends the use of special sulfosuccinamide salts as a subsequent additive and/or as stabilizers during the polymerization of acrylic ester and styrene/acrylic ester dispersions. With the binders thus obtained, plasticizer-containing gloss finishes having high blocking resistance can be produced. On the other hand, all other ionic emulsifiers investigated have no effect.

EP-A-0 609 756 discloses multistage acrylic ester, styrene/acrylic ester and vinyl/acrylic ester dispersions, it being necessary for one of the polymer phases to have a glass transition temperature in the range from $-55$ to $-5°$ C. and a further polymer phase to have a glass transition temperature in the range from 0 to 50° C. For the preparation of these dispersions, at least one anionic emulsifier and optionally at least one nonionic emulsifier are preferably used. In the examples, stabilizer systems consisting of nonionic and ionic emulsifiers in the ratio of about 1:1 are disclosed. They show that the solvent-free semi-gloss, satin and silk paint examples formulated using the binders according to the invention have blocking resistances which are comparable with solvent-containing systems, which is achieved by the presence of two polymer phases having the special glass transition temperature ranges.

EP-A-1 018 535 describes solvent-free coating compositions having improved blocking resistance, which contain, as a binder, a mixture of an acrylic ester copolymer dispersion and a vinyl ester copolymer dispersion. Characteristic of the acrylic ester component used in less than the required amount in the dispersion mixture is not only the necessary copolymerization of sterically hindered silanes but also the use of at least one anionic emulsifier during the preparation of this dispersion component for achieving the desired high blocking resistances of the coating compositions prepared using these binders. According to the teaching of this publication, the exclusive use of nonionic surfactants in the preparation of the acrylic ester component leads to insufficient blocking resistances. In contrast, the nature of the emulsifier which is used in the preparation of the vinyl ester component used in excess has no effect on the blocking resistance of the resulting coatings.

Vinyl ester dispersions having heterogeneous morphology are described in a number of patent applications.

Thus, DE-A-1 98 53 461 discloses protective colloid-stabilized copolymer latex particles having heterogeneous morphology, which are composed of a hard and a soft polymer phase, the preferred glass transition temperatures of the individual phases being from $-40$ to $+20°$ C. and from $+20$ to $+35°$ C., respectively.

The emulsion polymerization for the preparation of these dispersions, from which dispersion powders are prepared after they have been dried, stipulates the use of protective colloids. Surface-active substances, such as, for example, emulsifiers, can optionally be used. Also disclosed is the use of the copolymer latex particles as a binder in emulsion paints and renders.

DE-A-197 39 936 discloses plasticizer-free, heterogeneous vinyl acetate/ethene dispersions which are substantially stabilized with polyvinyl alcohol as a protective colloid and are prepared by seed polymerization of a copolymer A having a glass transition temperature of $>20°$ C. in the presence of a seed base comprising a copolymer B having a glass transition temperature of $<20°$ C.

The dispersions described above in DE-A-198 53 461 and DE-A-197 39 936 are substantially stabilized by protective colloids. Owing to the associated high content of water-soluble, readily swellable, polymeric stabilizers, coating compositions which contain these dispersions as binders are expected to have a high water absorption of the coating, which leads to a low abrasion resistance under abrasive load in the swollen state.

EP-A-0 444 827 describes vinyl ester/ethene/acrylic ester dispersions having a core-shell morphology, the composition of the polymer phases of core and shell being chosen so that the copolymer has only one glass transition temperature in the range from $-30$ to $0°$ C. By means of the vinylsilane copolymerization also prescribed, dispersions which are suitable as advantageous binders for crack-bridging coating materials are obtained. The low glass transition temperature of the core-shell copolymer does however rule out the use of these soft copolymer dispersions as binders for the formulation of blocking-resistant, binder-rich coating compositions.

Finally, WO-A-02/74,856 discloses an aqueous plastic dispersion based on a vinyl ester copolymer which is obtainable by multistage polymerization of a hard and a soft monomer mixture. The dispersion is predominantly ionically stabilized. Nonionic emulsifiers and/or structural units derived from monomers having nonionic stabilizing groups may be present but these are always used in less than the required amount. The mass ratio of ionic to nonionic stabilizing groups (emulsifiers and/or groups incorporated in the form of polymerized units) must not be less than 1. In a comparative example, it is shown that the performance characteristics, in particular the blocking resistance, of the coating materials which comprise binders having a comparatively high proportion of nonionic stabilizing groups are unsatisfactory.

An object of the present invention was therefore to overcome the disadvantages of the known, heterogeneous vinyl ester dispersions, in particular the abrasion resistance and foam formation of the coating compositions formulated using these dispersions, and to provide novel vinyl ester dispersions which make it possible to provide plasticizer- and solvent-free coating compositions which form crack-free coating films at low temperatures and are distinguished by improved blocking resistance and excellent abrasion resistance.

Surprisingly, it was found that dispersions of heterogeneous vinyl ester copolymers which contain a comparatively high proportion of nonionic stabilizers in addition to ionic stabilizers and which contain organosilicon compounds incorporated in the form of polymerized units at least in one polymer phase are outstandingly suitable for the formulation of solvent-free coating materials which exhibit little foam formation and are distinguished by an excellent combination of blocking resistance, gloss and abrasion resistance of the coatings produced therewith.

The present invention relates to an aqueous plastic dispersion based on a vinyl ester copolymer having a solids content of up to 80% by weight and a minimum film formation temperature below 20° C., the vinyl ester copolymer being characterized by the following features:
  it is a multistage polymer and is derived from at least one homo- or copolymer A and at least one homo- or copolymer B,
  the copolymer A is derived from a monomer composition A which would give a soft copolymer having a glass transition temperature in the range from 0 to 20° C.,
  the homo- or copolymer B is derived from a monomer composition B which would give a hard homo- or copolymer having a glass transition temperature in the range from 20 to 50° C.,
  monomer compositions A and B which give polymers A and B whose glass transition temperatures differ by at least 10 K are used,
  the sum of the proportions of the polymers A and B in the vinyl ester copolymer are at least 50% by weight, based on the vinyl ester copolymer,
  the weight ratio of monomer composition A to monomer composition B is in the range from 95/5 to 5/95,
  the monomer composition A contains from 50 to 100% by weight of at least one vinyl ester of carboxylic acids having 1 to 18 carbon atoms (M1), based on the total mass of the monomers used in monomer composition A,
  the monomer composition B contains from 50 to 100% by weight of at least one vinyl ester of carboxylic acids having 1 to 18 carbon atoms (M1), based on the total mass of the monomers used in monomer composition B,
  at least one of the monomer compositions A or B contains from 0.05 to 10% by weight of at least one unsaturated, copolymerizable organosilicon compound (M4), based on the total mass of the monomers used in this monomer composition,
  the vinyl ester copolymer contains, based on the total mass of the monomers used for the preparation of the vinyl ester copolymer, from 0 to 3% by weight of structural units derived from at least one ethylenically unsaturated, ionic monomer (M3),
  the vinyl ester copolymer contains, based on the total mass of the monomers used for the preparation of the vinyl ester copolymer, from 0 to 10% by weight of structural units derived from at least one ethylenically unsaturated, nonionic monomer (M5),
  the aqueous plastic dispersion contains from 0 to 3% by weight of ionic emulsifiers (S1),
  the aqueous plastic dispersion contains at least 0.5% by weight of nonionic emulsifiers (S2), and
  the ratio of the total mass of ionic components (M3) and (S1) to the total amount of nonionic components (M5) and (S2) used is less than 1.

The monomer composition A and/or B preferably also contains up to 25% by weight of at least one monoethylenically unsaturated, optionally halogen-substituted hydrocarbon having 2 to 4 carbon atoms (M2), in each case based on the total mass of the monomers used in the monomer composition.

In the present application, the term solids content is understood as meaning the total mass of copolymer, based on the total mass of the dispersion.

The solids content of the plastic dispersions according to the invention is preferably in the range from 20 to 80% by weight, particularly preferably in the range from 40 to 70% by weight and in particular in the range from 45 to 60% by weight.

The sum of the proportions of the polymers A and B in the vinyl ester copolymer is preferably from 75 to 100% by weight, particularly preferably from 80 to 100% by weight and in particular from 85 to 100% by weight, based on the total mass of the copolymer.

The weight ratio of monomer composition A to monomer composition B corresponding to the weight ratio of copolymer A to homo- or copolymer B is preferably in the range from 90/10 to 10/90, particularly preferably in the range from 80/20 to 20/80 and in particular in the range from 70/30 to 30/70.

The size of the copolymer particles of the dispersions according to the invention may vary within wide ranges. The mean particle diameter should, however, preferably not exceed 1000 nm and particularly preferably 600 nm. With regard to optimum coating properties, the average particle diameters should be in particular less than 350 nm. In the case of binder dispersions having high solids contents of more than 60% by weight, based on the total weight of the binder dispersion, it is, however, particularly preferable for reasons relating to the viscosity if the mean particle diameter is greater than 140 nm.

The plastic dispersions according to the invention preferably have a pH which is in the range from 2 to 9 and particularly preferably in the range from 3 to 7.

The minimum film formation temperature of the heterogeneous vinyl ester dispersions according to the invention is below 20° C. Preferably, the minimum film formation temperature is below 10° C., particularly preferably below 5° C. and in particular below 0° C.+

The vinyl ester copolymer particles of the dispersions according to the invention are in the widest sense multistage polymers having at least one soft polymer phase (i.e. derived from monomers which would give a homo- or copolymer having a low $T_g$) and at least one hard polymer phase (i.e. derived from monomers which would give a homo- or copolymer having a high $T_g$), which are prepared by multistage emulsion polymerization, the polymerization of the subsequent stage(s) being effected in the presence of the polymerization stage(s) formed beforehand. Particularly preferably, the multistage polymerization processes by means of which the plastic dispersions according to the invention can be prepared are two-stage processes.

The glass transition temperatures of the polymers A and B are calculated in the present application according to the equation by Fox (T. G. Fox, Bull. Am. Ph. Soc. (Ser. 11) 1, 123 [1956] and Ullmann's Enzyklopadie der technischen Chemie [Ullmann's Encyclopedia of Industrial Chemistry], Weinheim (1980), Volume 19, page 1-7-18), according to which the equation $$1/T_g = X^1/T_g^1 + X^2/T_g^2 + \ldots X^n/T_g^n$$

is a good approximation for the glass transition temperature $T_g$ of copolymers in the case of high molar masses, $X^1$, $X^2, \ldots X^n$ being the mass fractions 1, 2, ... n and $T_g^1$, $T_g^2, \ldots T_g^n$ being the glass transition temperatures, in degrees Kelvin, of the polymers composed in each case of only one of the monomers 1, 2 ... n. The latter are disclosed, for example, in Ullmann's Encyclopedia of Industrial Chemistry, VCH Weinheim, Vol. A 21 (1992) page 169 or in Brandrup, E. H. Immergut, Polymer Handbook, 3d ed, J. Wiley, New York 1989, such as, for example, the glass transition temperature of the ethene homopolymer of 148 K (cf. Brandrup, E. H. Immergut, Polymer Handbook, 3d ed, J. Wiley, New York 1989, page VI/214) and the glass transition temperature of the vinyl acetate homopolymer of 315 K (cf. Ullmann's Encyclopedia of Industrial Chemistry, VCH Weinheim, Vol. A 21 (1992) page 169). In a simplified calculation of the glass transition temperatures, it is possible to take into account only the main monomers (M1) and optionally (M2) mainly contributing to the formation of the phases and to neglect the contributions of the further monomers which result from mass fractions of less than 2% by weight, provided that the total sum of the mass fractions of these monomers does not exceed 4% by weight.

All monomers known to the person skilled in the art may be used as vinyl esters of carboxylic acids having 1 to 18 carbon atoms (M1).

Vinyl esters of carboxylic acids having 1 to 8 carbon atoms, such as, for example, vinyl formate, vinyl acetate, vinyl propionate, vinyl isobutyrate, vinyl pivalate and vinyl-2-ethylhexanoate; vinyl esters of saturated, branched monocarboxylic acids having 9, 10 or 11 carbon atoms in the acid radical (®Versaticsäuren); vinyl esters of relatively long-chain, saturated and unsaturated fatty acids, such as, for example, vinyl laurate and vinyl stearate; vinyl esters of benzoic acid and of p-tert-butylbenzoic acid and mixtures thereof are preferred.

Vinyl esters of carboxylic acids having 1 to 4 carbon atoms, mixtures of vinyl acetate and at least one versatic acid and mixtures of vinyl acetate and vinyl laurate are particularly preferred.

Vinyl acetate is particularly preferred.

Examples of monoethylenically unsaturated, optionally halogen-substituted hydrocarbons having 2 to 4 carbon atoms (M2), also referred to below as monoolefins having 2 to 4 carbon atoms, are ethene, propene, 1-butene, 2-butene, isobutene, vinyl chloride and vinylidene chloride, ethene and mixtures of ethene and vinyl chloride being preferred. The proportion of these monomers (M2) in the vinyl ester copolymer is preferably less than 20% by weight, based on the total mass of the monomers used for the preparation of the vinyl ester copolymer.

Preferred monomer mixtures comprising the monomers M1 and M2 for producing the plastic dispersions according to the invention from the copolymers A and B are vinyl acetate/vinyl chloride/ethene, vinyl acetate/vinyl laurate/ethene, vinyl acetate/vinyl laurate/ethene/vinyl chloride, vinyl acetate/vinyl versatate/ethene/vinyl chloride, vinyl versatate/ethene/vinyl chloride, vinyl acetate/vinyl versatate/ethene and vinyl acetate/ethene, the combination of vinyl acetate/ethene being particularly preferred.

In the present description, ethylenically unsaturated, ionic monomers (M3) are understood as meaning those ethylenically unsaturated monomers which have a water solubility of more than 50 g/l, preferably more than 80 g/l, at 25° C. and 1 bar and which are present to an extent of more than 50%, preferably more than 80%, as an ionic compound in dilute aqueous solution at pH 2 and/or pH 11 or are transformed to an extent of more than 50%, preferably more than 80%, into an ionic compound at pH 2 and/or pH 11 by protonation or deprotonation.

Suitable ethylenically unsaturated, ionic monomers (M3) are those compounds which carry a carboxyl, a sulfo, a phosphoric acid or a phosphonic acid group directly neighboring the double bond unit or are linked to it via a spacer. The following may be mentioned as examples: $\alpha,\beta$-unsaturated $C_3$-$C_8$-monocarboxylic acids, $\alpha,\beta$-unsaturated $C_5$-$C_8$-dicarboxylic acids and anhydrides thereof, and monoesters of $\alpha,\beta$-unsaturated $C_4$-$C_8$-dicarboxylic acids.

Unsaturated monocarboxylic acids, such as, for example, acrylic acid and methacrylic acid and anhydrides thereof; unsaturated dicarboxylic acids, such as, for example, maleic acid, fumaric acid, itaconic acid and citraconic acid and monoesters thereof with $C_1$-$C_{12}$-alkanols, such as monomethyl maleate and mono-n-butyl maleate, are preferred. Further preferred, ethylenically unsaturated, ionic monomers (M3) are ethylenically unsaturated sulfonic acids, such as, for example, vinylsulfonic acid, 2-acrylamido-2-methylpropanesulfonic acid, 2-acryloyloxy and 2-methacryloyloxyethanesulfonic acid, 3-acryloyloxy- and 3-methacryloyloxypropanesulfonic acid and vinylbenzenesulfonic acid, and ethylenically unsaturated phosphonic acids, such as, for example, vinylphosphonic acid.

In addition to said acids, it is also possible to use salts thereof, preferably alkali metal salts thereof or ammonium salts thereof and in particular sodium salts thereof, such as, for example, the sodium salts of vinylsulfonic acid and of 2-acrylamidopropanesulfonic acid.

Said ethylenically unsaturated, free acids are present in aqueous solution at pH 11 predominantly in the form of their conjugated bases in anionic form and, like said salts, may be referred to as anionic monomers.

Furthermore, monomers having a cationic functionality, such as, for example, monomers derived from quaternary ammonium groups, are also suitable as ethylenically unsaturated, ionic monomers (M3). However, anionic monomers are preferred.

At least one phase A or B derived from the monomer compositions, preferably the phase derived from the soft monomer mixture A, very particularly preferably both phases A and B of the vinyl ester copolymers of the plastic dispersion according to the invention, which phases are derived from the soft and the hard monomer composition, have up to 10% by weight, preferably up to 5% by weight, in particular from 0.05 to 2% by weight and particularly preferably from 0.1 to 1.5% by weight, based on the total mass of the respective monomer composition, of at least one unsaturated, copolymerizable organosilicon compound (M4), also referred to below as silane compound, incorporated in the form of copolymerized units.

Examples of said organosilicon compounds are monomers of the formula $RSi(CH_3)_{0-2}(OR^1)_{3-1}$, R having the meaning $CH_2=CR^2-(CH_2)_{0-1}$ or $CH_2=CR^2-CO_2-(CH_2)_{1-3}$, $R^1$ being a straight-chain or branched, optionally substituted alkyl radical having 3 to 12 carbon atoms, which may optionally be interrupted by an ether group, and $R^2$ is H or $CH_3$.

Organosilicon compounds of the formulae $CH_2=CR^2-(CH_2)_{0-1}-Si(CH_3)_{0-1}(OR^1)_{3-2}$ and $CH_2=CR^2-CO_2-(CH_2)_3-Si(CH_3)_{0-1}(OR^1)_{3-2}$, $R^1$ being a branched or straight-chain alkyl radical having 1 to 8 carbon atoms and $R^2$ being H or $CH_3$, are preferred.

Particularly preferred organosilicon compounds are vinylmethyldimethoxysilane, vinylmethyldiethoxysilane, vinylmethyldi-n-propoxysilane, vinylmethyldiisopropoxysilane, vinylmethyldi-n-butoxysilane, vinylmethyldi-sec-butoxysilane, vinylmethyldi-tert-butoxysilane, vinylmethyldi(2-methoxyisopropoxy)silane and Vinylmethyldioctyloxysilane.

Organosilicon compounds of the formula $CH_2=CR^2-(CH_2)_{0-1}-Si(OR^1)_3$ and $CH_2=CR^2-CO_2-(CH_2)_3-Si(OR^1)_3$, $R^1$ being a branched or straight-chain alkyl radical having 1 to 4 carbon atoms and $R^2$ being H or $CH_3$, are particularly preferred.

Examples of these are γ-(meth)acryloyloxypropyltris(2-methoxyethoxy)silane, γ-(meth)acryloyloxypropyltrismethoxysilane, γ-(meth)acryloyloxypropyltrisethoxysilane, γ-(meth)acryloyloxypropyltris-n-propoxysilane, γ-(meth)acryloyloxypropyltrisisopropoxysilane, γ-(meth)acryloyloxypropyltrisbutoxysilane, γ-acryloyloxypropyltris-(2-methoxyethoxy)silane, γ-acryloyloxypropyltrismethoxysilane, γ-acryloyloxypropyltrisethoxysilane, γ-acryloyloxypropyltris-n-propoxysilane, γ-acryloyloxypropyltrisisopropoxysilane, γ-acryloyloxypropyltrisbutoxysilane and vinyltris(2-methoxyethoxy)silane, vinyltrismethoxysilane, vinyltrisethoxysilane, vinyltris-n-propoxysilane, vinyltrisisopropoxysilane and vinyltrisbutoxysilane. Said organosilicon compounds can optionally also be used in the form of their (partial) hydrolysis products.

Furthermore, the vinyl ester copolymer may contain up to 10% by weight, preferably up to 5% by weight, of ethylenically unsaturated, nonionic monomers (M5), based on the total mass of the monomers used in the respective monomer mixture, incorporated in the form of copolymerized units. However, the proportions of these monomers (M5) is preferably below 2% by weight and particularly preferably below 1% by weight.

In the present application, ethylenically unsaturated, nonionic monomers (M5) are understood as meaning those ethylenically unsaturated compounds which have a water solubility of more than 50 g/l, preferably more than 80 g/l, at 25° C. and 1 bar and which are present predominantly in nonionic form in dilute aqueous solution at pH 2 and pH 11.

Preferred ethylenically unsaturated, nonionic monomers (M5) are both the amides of the carboxylic acids mentioned in relation to the ethylenically unsaturated, ionic monomers (M3), such as, for example, (meth)acrylamide and acrylamide, and water-soluble N-vinyllactams, such as, for example, N-vinylpyrrolidone, as well as those compounds which contain covalently bonded polyethylene glycol units as ethylenically unsaturated compounds, such as, for example, polyethylene glycol mono- or diallyl ether or the esters of ethylenically unsaturated carboxylic acids with polyalkylene glycols.

In addition, the vinyl ester copolymer may contain up to 30% by weight, preferably up to 15% by weight and particularly preferably up to 10% by weight, of at least one further, ethylenically unsaturated monomer (M6), based on the total mass of the monomers present in the respective monomer mixture, incorporated in the form of polymerized units.

Particularly preferred further, ethylenically unsaturated monomers (M6) are the esters of ethylenically unsaturated $C_3$-$C_8$-mono- and dicarboxylic acids with $C_1$-$C_{18}$-, preferably $C_1$-$C_{12}$- and particularly preferably $C_1$-$C_8$-alkanols or $C_5$-$C_8$-cycloalkanols. Suitable $C_1$-$C_{18}$-alkanols are, for example methanol, ethanol, n-propanol, isopropanol, 1-butanol, 2-butanol, isobutanol, tert-butanol, n-hexanol, 2-ethylhexanol, lauryl alcohol and stearyl alcohol. Suitable cycloalkanols are, for example, cyclopentanol and cyclohexanol. The esters of acrylic acid, of methacrylic acid, of crotonic acid, of maleic acid, of itaconic acid, of citraconic acid and of fumaric acid are particularly preferred. The esters of acrylic acid and/or of (meth)acrylic acid, such as, for example, methyl(meth)acrylate, ethyl(meth)acrylate, isopropyl (meth)acrylate, n-butyl(meth)acrylate, isobutyl(meth)acrylate, 1-hexyl (meth)acrylate, tert-butyl(meth)acrylate, 2-ethylhexyl(meth) acrylate, and the esters of fumaric acid and of maleic acid, such as, for example, dimethyl fumarate, dimethyl maleate, di-n-butyl maleate, di-n-octyl maleate, and di-2-ethylhexyl maleate, are particularly preferred. If appropriate, said esters may also be substituted by epoxy and/or hydroxyl groups. Furthermore, nitriles of α,β-monoethylenically unsaturated $C_3$-$C_8$-carboxylic acids, such as, for example, acrylonitrile, and methacrylonitrile, are suitable as ethylenically unsaturated monomers (M6). Conjugated $C_4$-$C_8$-dienes, such as, for example, 1,3-butadiene, isoprene and chloroprene, may also be used as monomers (M6).

Partial substitution of the vinyl ester with said compounds is carried out as a rule in order to adjust the properties of the homo- or copolymers A and/or B, such as, for example, the hydrophobicity/hydrophilicity.

Furthermore, those compounds which are known to improve the adhesion properties and/or to act as crosslinking agents may be used as further, ethylenically unsaturated monomers (M6).

The adhesion-improving monomers include both compounds which have an acetoacetoxy unit covalently bonded to the double bond system and compounds having covalently bonded urea groups. The first-mentioned compounds include in particular acetoacetoxy ethyl(meth)acrylate and allyl acetoacetate. The compounds containing urea groups include, for example, N-vinyl- and N-allylurea and derivatives of imidazolidin-2-one, such as, for example, N-vinyl- and N-allylimidazolidin-2-one, N-vinyloxyethylimidazolidin-2-one, N-(2-(meth)acrylamidoethyl)imidazolidin-2-one, N-(2-(meth)acryloxyethyl)imidazolidin-2-one and N-(2-(meth)acryloxyacetamidoethyl)imidazolidin-2-one, and further adhesion promoters known to the person skilled in the art and based on urea or imidazolidin-2-one. Diacetoneacrylamide in combination with a subsequent addition of adipic dihydrazide to the dispersion is also suitable for improving the adhesion. The adhesion-promoting monomers can optionally be used in amounts of from 0.1 to 10% by weight, preferably from 0.5 to 5% by weight, based on the total mass of the monomers used in the respective monomer mixture. In a preferred embodiment, however, the polymers A and B contain none of these adhesion-promoting monomers incorporated in the form of copolymerized units.

Both bifunctional and polyfunctional monomers may be used as crosslinking monomers. Examples of these are diallyl phthalate, diallyl maleate, triallyl cyanurate, tetraallyloxyethane, divinylbenzene, butanediol 1,4-di(meth)acrylate, triethylene glycol di(meth)acrylate, divinyl adipate, allyl(meth)acrylate, vinyl crotonate, methylenebisacrylamide, hexanediol diacrylate, pentaerythrol diacrylate and trimethylolpropane triacrylate. The crosslinking monomers can optionally be used in amounts of from 0.02 to 5% by weight, preferably from 0.02 to 1% by weight, based on the total mass of the monomers used in the respective monomer mixture. In a preferred embodiment, however, the polymers A and B contain none of these crosslinking monomers incorporated in the form of copolymerized units.

In addition to the vinyl ester copolymer, the aqueous plastic dispersion according to the invention contains from 0 to 3% by weight, preferably from 0.1 to 3% by weight, particularly preferably from 0.5 to 2% by weight, based on the total mass of the monomers used for the preparation of the vinyl ester copolymer, of ionic emulsifiers (S1). The ionic emulsifiers include both anionic and cationic emulsifiers, anionic emulsifiers and mixtures of anionic emulsifiers being particularly preferred.

The anionic emulsifiers include alkali metal and ammonium salts of alkylsulfates (alkyl radical: $C_6$ to $C_{18}$), alkylphosphonates (alkyl radical: $C_6$ to $C_{18}$), of sulfuric acid monoesters or phosphoric acid mono- and diesters of ethoxylated alkanols (degree of ethoxylation: from 2 to 50, alkyl radical: $C_6$ to $C_{22}$) and of ethoxylated alkylphenols (degree of ethoxylation: from 3 to 50, alkyl radical: $C_4$ to $C_9$), of alkanesulfonic acids (alkyl radical: $C_{12}$ to $C_{18}$), of alkylarylsulfonic acids (alkyl radical: $C_9$ to $C_{18}$), of sulfosuccinic acid monoesters and sulfosuccinic acid diesters of alkanols (alkyl radical: $C_6$ to $C_{22}$) and ethoxylated alkanols (degree of ethoxylation: from 2 to 50, alkyl radical: $C_6$ to $C_{22}$), and of nonethoxylated and ethoxylated alkylphenols (degree of ethoxylation: from 3 to 50, alkyl radical: $C_4$ to $C_9$).

As a rule, the abovementioned emulsifiers are used as industrial mixtures, the data on the length of alkyl radical and EO chain relating to the respective maximum of the distributions occurring in the mixtures. Examples from said emulsifier classes are ®Texapon K12 (sodium laurylsulfate from Cognis), ®Emulsogen EP($C_{13}$-$C_{17}$-alkylsulfonate from Clariant), ®Maranil A 25 IS (sodium n-alkyl-($C_{10}$-$C_{13}$)benzenesulfonate from Cognis), ®Genapol liquid ZRO (sodium $C_{12}$/$C_{14}$-alkyl ether sulfate having 3 EO units from Clariant), ®Hostapal BVQ-4 (sodium salt of a nonylphenol ether sulfate having 4 EO units from Clariant), ®Aerosol MA 80 (sodium dihexylsulfosuccinate from Cyctec Industries), ®Aerosol A-268 (disodium isodecylsulfosuccinate from Cytec Industries), ®Aerosol A-103 (disodium salt of a monoester of sulfosuccinic acid with an ethoxylated nonylphenol from Cytec Industries).

Compounds of the formula 1

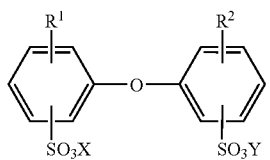

in which $R^1$ and $R^2$ are hydrogen or $C_4$-$C_{24}$-alkyl, preferably $C_6$-$C_{16}$-alkyl, and are not simultaneously hydrogen, and X and Y are alkali metal ions and/or ammonium ions, are furthermore suitable. Frequently, industrial mixtures which have a proportion of from 50 to 90% by weight of the monoalkylated product, for example Dowfax® 2A1 ($R^1$=$C_{12}$-alkyl; DOW Chemical), are also used in the case of these emulsifiers. The compounds are generally known, for example from U.S. Pat. No. 4,269,749, and are commercially available.

In addition, the Gemini surfactants known to the person skilled in the art, as described, for example, in the article "Gemini-Tenside [Gemini Surfactants]" by F. M. Menger and J. S. Keiper (Angew. Chem. 2000, pages 1980-1996) and the publications cited therein, are also particularly suitable as ionic emulsifiers.

The cationic emulsifiers include, for example, alkylammonium acetates (alkyl radical: $C_8$ to $C_{12}$), quaternary compounds containing ammonium groups and pyridinium compounds.

When choosing the ionic emulsifiers, it must of course be ensured that incompatibilities in the resulting plastic dispersion, which may lead to coagulation, are ruled out. Anionic emulsifiers in combination with anionic monomers (M3) or cationic emulsifiers in combination with cationic monomers (M3) are therefore preferably used, the combinations of anionic emulsifiers and anionic monomers being particularly preferred.

In addition to the optionally present ionic emulsifiers, the aqueous plastic dispersion according to the invention contains at least 0.5% by weight of nonionic emulsifiers (S2). These are typically present in amounts of up to 10% by weight, preferably from 0.5 to 5% by weight, based on the total mass of the monomers used.

The ratio of the total mass of ionic components (M3) and (S1) to the total amount of nonionic components (M5) and (S2) used should be chosen so that said ratio is less than 1. Particularly preferably, the plastic dispersion according to the invention contains, as nonionic components, only nonionic emulsifiers (S2) and no structural units derived from ethylenically unsaturated, nonionic monomers.

Suitable nonionic emulsifiers (S2) are araliphatic and aliphatic nonionic emulsifiers, for example ethoxylated mono-, di- and trialkylphenols (degree of ethoxylation: from 3 to 50, alkyl radical: $C_4$ to $C_9$), ethoxylates of long-chain, branched or straight-chain alcohols (degree of ethoxylation: from 3 to 50, alkyl radical: $C_6$ to $C_{36}$) and polyethylene oxide/polypropylene oxide block copolymers.

Ethoxylates of long-chain, branched or straight-chain alkanols (alkyl radical: $C_6$ to $C_{22}$, average degree of ethoxylation: from 3 to 50) are preferably used, and among these particularly preferably those based on natural alcohols, Guerbet alcohols or oxo alcohols having a linear or branched $C_{12}$-$C_{18}$-alkyl radical and a degree of ethoxylation 10 of from 8 to 50.

Further suitable emulsifiers are to be found in Houben-Weyl, Methoden der organischen Chemie [Methods of Organic Chemistry], Volume XIV/I, Makromolekulare Stoffe [Macromolecular Substances], Georg-Thierrie-Verlag, Stuttgart, 1961, pages 192-208).

In addition, both ionic and nonionic emulsifiers which contain one or more unsaturated double bond units as an additional functionality and can be incorporated into the resulting polymer chains as ethylenically unsaturated, ionic monomers (M3) or as ethylenically unsaturated, nonionic monomers (M5) during the polymerization process may be used. These compounds referred to as copolymerizable emulsifiers ("surfiners") are generally known to the person skilled in the art. Examples are to be found in the series of publications (e.g.: Reactive surfactants in heterophase polymerization" by A. Guyot et al. in Acta Polym. 1999, pages 57-66) and are commercially available (e.g. ®Emulsogen R 208 from Clariant or Trem LF 40 from Cognis).

In addition, the total mass of ionic emulsifiers (S1) and ethylenically unsaturated, ionic monomers (M3) which are used for stabilizing the plastic dispersion is not more than 3% by weight, preferably not more than 1% by weight, based on the total mass of the vinyl ester copolymer.

In addition to ionic stabilizing components, the plastic dispersion according to the invention contains nonionic stabilizing components.

The total mass of nonionic emulsifiers (S2) and ethylenically unsaturated, nonionic monomers (M5) which are used for stabilizing the plastic dispersion is not more than 10% by weight, preferably not more than 5% by weight, based on the total mass of the vinyl ester copolymer.

Particularly preferably, the ratio of the total amount of ionic components (M3) and (S1) to the total amount of nonionic components (M5) and (S2) used is from 0.0 to 0.9.

In a further preferred embodiment, the plastic dispersion according to the invention contains protective colloids, preferably polyvinyl alcohols, starch derivatives and cellulose derivatives and vinylpyrrolidone.

Polyvinyl alcohols are very particularly preferably used.

The proportion of these components, based on the total mass of the plastic dispersion, is usually not more than 10% by weight, preferably not more than 5% by weight.

The present invention also relates to methods for producing the aqueous plastic dispersions according to the invention which are based on vinyl ester copolymers.

The invention therefore also relates to a method for producing a plastic dispersion by aqueous, free radical emulsion polymerization of a monomer or a mixture of monomer B first a homo- or copolymer B is prepared and then the homo- or copolymer A is prepared in the aqueous dispersion of the homo- or copolymer B by free radical emulsion polymerization of a monomer or of a monomer mixture A, the free radical emulsion polymerization being carried out in the presence of nonionic emulsifiers (S2) and optionally in the presence of ethylenically unsaturated, ionic monomers (M3) and/or ionic emulsifiers (S1), so that the total mass of nonionic emulsifiers (S2) in the end product is at least 0.5% by weight, and the ratio of the total mass of the ionic components (M3) and (S1) to the total amount of nonionic components (M5) and (S2) used in the end product is less than 1, with the proviso that the preparation of the homo- or copolymer B can also be effected after the preparation of the homo- or copolymer A.

The preparation is effected by so-called step polymerization. This is generally understood as meaning a procedure in which, in a $1^{st}$ stage, the monomers of the $1^{st}$ stage are polymerized by a free radical, aqueous emulsion polymerization, preferably in the presence of a seed latex which is preferably prepared in situ, and the monomers of the $2^{nd}$ stage are then polymerized in the aqueous dispersion of the resulting polymer of the $1^{st}$ stage. If appropriate, further polymerization stages may follow. A distinction is made here between the comonomers of the $1^{st}$ and $2^{nd}$ stages with regard to the type of monomers and/or with respect to the amounts of the monomers relative to one another. Preferably, the type of monomers to be polymerized is the same for both stages. There are then only differences with regard to the amounts of the monomers relative to one another.

In general, when choosing the monomer composition of the individual stages, a procedure is adopted in which, in a first stage, a monomer composition B which leads to the formation of the homo- or copolymer B is chosen and, in a further stage, preferably the second stage, a corresponding monomer or monomer mixture A which leads to the formation of the homo- or copolymer A is polymerized.

However, it is also possible to proceed in the converse manner and to produce the homo- or copolymer B in the presence of the previously prepared homo- or copolymer A and optionally further stages.

The vinyl ester copolymers prepared by means of the step polymerization comprise, regardless of the detectable morphology, all copolymers in which the polymer components A and B have been produced by successive stages of the emulsion polymerization.

The monomer composition A for producing the homo- or copolymer A contains, based on the total amount of the monomers used in the monomer composition A, more than 50% by weight, preferably more than 70% by weight, particularly preferably more than 80% by weight and in particular from 80 to 95% by weight of monomers (M1), less than 25% by weight, preferably from 5 to 20% by weight and particularly preferably from 10 to 15% by weight of monoolefins having 2 to 4 carbon atoms (M2), from 0 to 10% by weight, preferably from 0.05 to 5% by weight, of at least one unsaturated, copolymerizable organosilicon compound (M4) and preferably up to 1% by weight of ionic monomers (M3), the composition of the monomer mixture being chosen so that a copolymer polymerized separately with this monomer mixture has a glass transition temperature in the range from 0 to 20° C., preferably in the range from 0 to 15° C. and particularly preferably in the range from 0 to 10° C.

The monomer composition for producing the homo- or copolymer B contains, based on the total amount of the monomers used for the preparation of the homo- or copolymers B, more than 50% by weight, preferably more than 70% by weight, particularly preferably more than 80% by weight and in particular from 90 to 98% by weight of monomers (M1) and less than 25% by weight, preferably less than 20% by weight, particularly preferably from 0.1 to 10% by weight and in particular from 0.1 to 5% by weight of monoolefins having 2 to 4 carbon atoms (M2), and from 0 to 10% by weight, preferably from 0.05 to 5% by weight of at least one unsaturated, copolymerizable organosilicon compound (M4) and preferably up to 1% by weight of ionic monomers (M3), the composition of the monomer (mixture) B being chosen so that a homo- or copolymer polymerized separately with this monomer mixture has a glass transition temperature in the range from 20 to 50° C., preferably in the range from 25 to 45° C. and particularly preferably in the range from 30 to 43° C.

In addition, when choosing the monomer compositions of the two polymers A and B of the heterogeneous vinyl ester copolymer, it should be ensured that the glass transition temperatures thereof differ by more than 10 K, preferably by more than 15 K and particularly preferably by more than 20 K.

Particularly preferably when choosing the monomer compositions, less than 20% by weight, preferably from 0.1 to 20% by weight and particularly preferably from 0.1 to 15% by weight, based on the total amount of the monomers used for the preparation of the copolymer, of ethylenically unsaturated monoolefins having 2 to 4 carbon atoms (M2) are used.

In particular embodiments, it may be necessary to carry out the individual polymerization stages at different polymerization pressures, owing to the different proportions of monoolefins (M2) which are present in the gaseous state of aggregation under the reaction conditions. In these cases, the pressure which is generated by the metering of the gaseous monomer components (M2) is preferably from 0 to 10 bar, particularly preferably from 2 to 10 bar, during the polymerization of the monomer composition leading to copolymer B and preferably from 10 to 120 bar, particularly preferably from 20 to 60 bar, during the polymerization of the monomer composition leading to copolymer A.

Surprisingly, it was found that polymerization of the individual stages up to monomer contents of <0.3%, as is usually carried out for generating separate polymer phases, is not necessary for the preparation of the vinyl ester copolymers, copolymer A being produced in the presence of copolymer B.

In a particularly preferred embodiment, it is therefore sufficient if, after the production of the copolymer B, the concentration of the monomer component(s) M2, which are present in gaseous form under the reaction conditions, is gradually increased with continuous metering of liquid monomer components, over an appropriate time interval, for generating the copolymer A (pressure increase). This process is distinguished by substantially reduced reactor residence times compared with the processes usually used.

The polymerization is generally carried out at temperatures in the range from 20 to 120° C., preferably in the range from 40 to 95° C. and particularly preferably in the range from 50 to 90° C.

The aqueous plastic dispersions according to the invention which are based on vinyl ester copolymers are preferably produced by free radical, aqueous emulsion polymerization of said monomers in the presence of at least one free radical polymerization initiator and at least one surface-active substance.

Suitable free radical polymerization initiators are all known initiators which are capable of initiating a free radical, aqueous emulsion polymerization. They may be both peroxides, such as, for example, alkali metal peroxodisulfates, and azo compounds. Other polymerization initiators which may be used are so-called redox initiators, which are composed of at least one organic and/or inorganic reducing agent and at least one peroxide and/or hydroperoxide, such as, for example, tert-butyl hydroperoxide with sulfur compounds, such as, for example, sodium salt of hydroxymethanesulfinic acid, sodium sulfite, sodium disulfite, sodium thiosulfate and acetone bisulfite adduct, or hydrogen peroxide with ascorbic acid. Combined systems which contain a small amount of metal compound which is soluble in the polymerization medium and whose metallic component may occur in a plurality of valency states, such as, for example, ascorbic acid/iron sulfate/hydrogen peroxide, may also be used, the sodium salt of hydroxymethanesulfinic acid, acetone bisulfite adduct, sodium sulfite, sodium hydrogen sulfite or sodium bisulfite frequently also being used instead of ascorbic acid and organic peroxides, such as, for example, tert-butyl hydroperoxide, or alkali metal peroxodisulfates and/or ammonium peroxodisulfate, being used instead of hydrogen peroxide. Instead of said acetone bisulfite adduct, it is also possible to use further bisulfite adducts known to the person skilled in the art, as described, for example, in EP-A-0 778 290 and in the literature cited therein. Further preferred initiators are peroxodisulfates, such as, for example, sodium peroxodisulfate. The amount of the free radical initiator systems used is preferably from 0.05 to 2.0% by weight, based on the total amount of the monomers to be polymerized.

Protective colloids and the above-described ionic and nonionic emulsifiers S1 and S2, whose relative molecular weights are below 2000 g/mol in contrast to the protective colloids, are usually used as surface-active substances in the emulsion polymerization.

The surface-active substances are usually used in amounts of up to 10% by weight, preferably from 0.5 to 7% by weight and particularly preferably from 1 to 6% by weight, based on the monomers to be polymerized.

In a preferred embodiment of the method according to the invention, the emulsion polymerization is effected in the presence of protective colloids, for example of polyvinyl alcohols, starch derivatives and cellulose derivatives and vinylpyrrolidone, polyvinyl alcohols and cellulose derivatives, such as, for example, hydroxyethyl celluloses, being preferred.

A detailed description of further, suitable protective colloids is to be found in Houben-Weyl, Methoden der organischen Chemie [Methods of Organic Chemistry], Volume XIV/I, Makromolekulare Stoffe [Macromolecular Substances], Georg Thieme Verlag, Stuttgart 1961, pages 411 to 420.

The molecular weight of the vinyl ester copolymers can be adjusted by addition of small amounts of one or more substances which regulate the molecular weight. These so-called "regulators" are used in general in an amount of up to 2% by weight, based on the monomers to be polymerized. "Regulators" which may be used are all those substances which are known to the person skilled in the art.

For example, organic thio compounds, silanes, allyl alcohols and aldehydes are preferred.

The emulsion polymerization is usually effected by the batch procedure, preferably by a semicontinuous method. In semicontinuous methods, the main amount, i.e. at least 70%, preferably at least 90%, of the monomers to be polymerized are fed continuously (including step gradient procedure) to the polymerization batch. This procedure is also referred to as a monomer feed method, monomer feed being understood as meaning the metering in of gaseous monomers, liquid monomer mixtures, monomer solutions or in particular aqueous monomer emulsions. The metering of the individual monomers can be effected through separate feeds.

In addition to the seed-free method of production, the emulsion polymerization can also be effected by the seed latex method or in the presence of seed lattices produced in situ, for establishing a defined polymer particle size. Such methods are known and are described in detail in a large number of patent applications (e.g. EP-A-0 040 419 and EP-A-0 567 812) and publications ("Encyclopedia of Polymer Science and Technology", Vol. 5, John Wiley & Sons Inc., New York 1966, page 847).

After the actual polymerization reaction, it may be desirable and/or necessary to substantially free the aqueous plastic dispersions according to the invention from odoriferous substances, such as, for example, residual monomers and other volatile, organic constituents. This can be achieved in a manner known per se, for example physically by distillative removal (in particular via steam distillation) or by stripping with an inert gas. Furthermore, the reduction of the residual monomers can also be effected chemically by free radical post polymerization, in particular by the action of the redox initiator systems, as described, for example, in DE-A-44 35 423. A post polymerization with a redox initiator system comprising at least one organic peroxide and an organic and/or inorganic sulfite is preferred. A combination of physical and chemical methods is particularly preferred, the further reduction of the residual monomer content being effected by means of physical methods to preferably <1000 ppm, particularly preferably <500 ppm, in particular <100, after reduction of the residual monomer content by chemical post polymerization.

The aqueous plastic dispersions according to the invention which are based on vinyl ester copolymers are used, for example, as binders in pigment-containing, aqueous preparations which serve for the coating of substrates. These include, for example, synthetic resin-bound renders, tile adhesives, paints, such as, for example, emulsion paints, emulsion finishes and glazes, sealing compounds and sealing compositions, preferably for porous components, but also papercoating slips.

However, the aqueous plastic dispersions can also be used, directly or after addition of rheology-modifying additives and/or further components, as aqueous preparations for the coating of substrates. Such aqueous preparations are, for example, primers, clear finishes or food coatings which protect food, such as, for example, cheese or meat-containing preparations, from harmful environmental influences and/or drying out.

The present invention therefore furthermore relates to aqueous preparations containing the aqueous plastic dispersion according to the invention which is based on vinyl ester copolymers. Pigment-containing, aqueous preparations are a preferred embodiment of the aqueous preparations.

These preferred, pigment-containing preparations, particularly preferably emulsion paints, contain in general from 30 to 75% by weight, preferably from 40 to 65% by weight, of nonvolatile constituents. These are to be understood as meaning all constituents of the preparation except for water, but at least the total amount of solid binder, filler, pigment, plasticizer and polymeric auxiliaries.

Of the nonvolatile constituents, preferably
a) from 3 to 90% by weight, particularly preferably from 10 to 60% by weight, are accounted for by the solid binder, i.e. the vinyl ester copolymer,
b) from 5 to 85% by weight, particularly preferably from 10 to 60% by weight, by at least one inorganic pigment,
c) from 0 to 85% by weight, particularly preferably from 20 to 70% by weight, by inorganic fillers and
d) from 0.1 to 40% by weight, particularly preferably from 0.5 to 15% by weight, by conventional auxiliaries.

Solvent- and plasticizer-free, aqueous preparations are particularly preferred.

The pigment volume concentration (PVC) of the pigment-containing, aqueous preparations according to the invention is in general above 5%, preferably in the range from 10 to 90%. In particularly preferred embodiments, the PVCs are either in the range from 10 to 45% or in the range from 60 to 90%, in particular from 70 to 90%.

Pigments which may be used are all pigments known to the person skilled in the art for said intended use. Preferred pigments for the aqueous preparations according to the invention, preferably for emulsion paints, are, for example, titanium dioxide, preferably in the form of rutile, barium sulfate, zinc oxide, zinc sulfide, basic lead carbonate, antimony trioxide and lithopone (zinc sulfide and barium sulfate). However, the aqueous preparations may also contain colored pigments, for example iron oxides, carbon black, graphite, luminescent pigments, zinc yellow, zinc green, ultramarine, manganese black, antimony black, manganese violet, Paris blue or Schweinfurt green. In addition to the inorganic pigments, the preparations according to the invention may also contain organic colored pigments, for example sepia, gamboge, Cassel brown, toluidine red, para red, Hansa yellow, indigo, azo dyes, anthraquinoid and indigoid dyes and dioxazine, and quinacridone, phthalocyanine, isoindolinone and metal complex pigments.

Fillers which may be used are all fillers known to the person skilled in the art for said intended use. Preferred fillers are aluminosilicates, such as, for example, feldspars, silicates, such as, for example, kaolin, talc, mica, magnesite, alkaline earth metal carbonates, such as, for example, calcium carbonate, for example in the form of calcite or chalk, magnesium carbonate, dolomite, alkaline earth metal sulfates, such as, for example, calcium sulfate, and silica. The fillers can be used either as individual components or as filler mixtures. Filler mixtures, such as, for example, calcium carbonate/kaolin and calcium carbonate/talc, are preferred in practice. Synthetic resin-bound renders may also contain relatively coarse aggregates, such as sands or sandstone granules.

In general, finely divided fillers are preferred in emulsion paints.

In order to increase the hiding power and to save white pigments, finely divided fillers, such as, for example, precipitated calcium carbonate or mixtures of different calcium carbonates having different particle sizes, are preferably frequently used in emulsion paints. Mixtures of colored pigments and fillers are preferably used for adjusting the hiding power of the hue and the depth of color.

The customary auxiliaries include wetting agents or dispersants, such as sodium, potassium, or ammonium polyphosphates, alkali metal and ammonium salts of polyacrylic acids and of polymaleic acid, polyphosphonates, such as sodium 1-hydroxyethane-1,1-diphosphonate, and naphthalenesulfonic acid salts, in particular sodium salts thereof. In addition, suitable amino alcohols, such as, for example, 2-amino-2-methylpropanol, may be used as dispersants. The dispersants or wetting agent are preferably used in an amount of from 0.1 to 2% by weight, based on the total weight of the emulsion paint.

Furthermore, the auxiliaries may also comprise thickeners, for example cellulose derivatives, such as methylcellulose, hydroxyethylcellulose and carboxymethylcellulose, and furthermore casein, gum Arabic, tragacanth gum, starch, sodium alginate, polyvinyl alcohol, polyvinylpyrrolidone, sodium polyacrylates, water-soluble copolymers based on acrylic and (meth)acrylic acid, such as acrylic acid/acrylamide and (meth)acrylic acid/acrylic ester copolymers and so-called associative thickeners, such as styrene/maleic anhydride polymers or preferably hydrophobically modified polyetherurethanes (HEUR) known to the person skilled in the art, hydrophobically modified acrylic acid copolymers (HASE) polyetherpolyols.

Inorganic thickeners, such as, for example, bentonites or hectorite, may also be used.

The thickeners are preferably used in amounts of from 0.1 to 3% by weight, particularly preferably from 0.1 to 1% by weight, based on the total weight of the aqueous preparation.

The aqueous preparations according to the invention may also contain crosslinking additives. Such additives may be: aromatic ketones, such as, for example, alkyl phenyl ketones, which optionally have one or more substituents on the phenyl ring, or benzophenone and substituted benzophenones as photoinitiators. Photoinitiators suitable for this purpose are disclosed, for example, in DE-A-38 27 975 and EP-A-0 417 568. Suitable compounds having a crosslinking effect are also water-soluble compounds having at least two amino groups, for example dihydrazides of aliphatic dicarboxylic acids, as disclosed, for example, in DE-A-39 01 073, if the vinyl ester copolymer P contains, incorporated in the form of copolymerized units, monomers containing carbonyl groups.

In addition, waxes based on paraffins and polyethylene, and dulling agents, antifoams, preservatives and water repellents, biocides, fibers and further additives known to the person skilled in the art may also be used as auxiliaries in the aqueous preparations according to the invention.

The dispersions according to the invention can be used to produce not only solvent- and plasticizer-free preparations but of course also coating systems which contain solvents and/or plasticizers as film formation auxiliaries. Film formation auxiliaries are generally known to the person skilled in the art and can be used generally in amounts of from 0.1 to 20% by weight, based on the vinyl ester copolymer present in the preparation, so that the aqueous preparation has a minimum film formation temperature of less than 15° C., preferably in the range from 0 to 10° C. The use of these film formation auxiliaries is of course not necessary in view of the advantageous properties of the plastic dispersions according to the invention. In a preferred embodiment, the aqueous preparations according to the invention therefore contain no film formation auxiliary.

The aqueous preparations according to the invention are stable fluid systems which can be used for coating a multiplicity of substrates. Consequently, the present invention also relates to methods for coating substrates and to the coating materials themselves. Suitable substrates are, for example, wood, concrete, metal, glass, ceramics, plastic, renders, wallpapers, paper and coated, primed or weathered substrates. The application of the preparation to the substrate to be coated is effected in a manner dependent on the form of the preparation. Depending on the viscosity and the pigment content of the preparation and on the substrate, the application can be effected by means of roll-coating, brushing, knife-coating or as a spray.

The invention is described in more detail below with reference to working examples, but without being limited in any way thereby.

Production and characterization of the plastic dispersions according to the invention.

The dispersions produced in the examples and comparative examples were produced in a 70 l pressure autoclave with jacket cooling and a permitted pressure range up to 160 bar. The parts and percentages used in the following examples are based on weight, unless noted otherwise.

COMPARATIVE EXAMPLE 1

Production of a vinyl acetate/ethylene copolymer dispersion not according to the invention, with subsequent elimination of residual monomers.

An aqueous solution consisting of the following constituents was introduced into a pressure apparatus having a stirrer, jacket heating and metering pumps:

18813 g of water, 84.2 g of sodium acetate, 5033 g of a 20% strength by weight aqueous solution of a nonylphenol ethoxylate having 30 mol of ethylene oxide, 67.1 g of sodium laurylsulfate, 2013 g of a 10% strength by weight aqueous polyvinyl alcohol solution (viscosity of the 4% strength by weight aqueous solution 23 mPa*s), 566 g of a 30% strength by weight aqueous sodium vinylsulfonate solution and 33 g of a 1% strength by weight aqueous solution of $FeII(SO_4) \times 7H_2O$. The pH of the solution was 7.2. The apparatus was freed from atmospheric oxygen and ethylene was forced into the apparatus. At an ethylene pressure of 20 bar, a mixture of 13.1 g of vinyltrimethoxysilane (VTM) and 2932 g of vinyl acetate and 2.63 g of Brüggolit E01, dissolved in 194 g of water, was metered in. Heating was effected to an internal temperature of 60° C. and a solution of 3.75 g of 70% strength aqueous tert-butylhydroperoxide solution in 194 g of water was metered in at 50° C. Cooling was effected to remove the heat of reaction. On reaching 60° C., a mixture of 121.1 g of vinyltrimethoxysilane (VTM) and 27.135 g of vinyl acetate was metered in 240 minutes and 26.6 g of Brüggolit E01, dissolved in 1964 g of water, were metered in the course of 240 minutes and a solution of 38 g of 70% strength aqueous tert-butyl hydroperoxide solution in 1964 g of water in the course of 240 minutes, the ethylene pressure being kept at 35 bar, until 3355 g of ethylene were in the reactor. After the end of the metering, a solution of 33.6 g of sodium persulfate in 792 g of water was metered in and the internal temperature was increased to 80° C. and kept at this temperature for 1 hour. The major part of the unconverted ethylene was then expelled in gaseous form with stirring, and 2 l of water were added. Thereafter, 2 l of water were distilled off in the course of 2 hours with application of a vacuum, with the result that the residual vinyl acetate content of the dispersion was reduced to 0.05% by weight, based on the dispersion.

EXAMPLES C2 AND 3-7

General working method for the production of a vinyl acetate/ethylene copolymer dispersion, with subsequent elimination of residual monomers An aqueous solution consisting of the following constituents was introduced into a pressure apparatus having a stirrer, jacket heating and metering pumps:

18813 g of water, 84.2 g of sodium acetate, 5033 g of a 20% strength by weight aqueous solution of a nonylphenol ethoxylate having 30 mol of ethylene oxide, 67.1 g of sodium laurylsulfate, 2013 g of a 10% strength by weight aqueous polyvinyl alcohol solution (viscosity of the 4% strength by weight aqueous solution 23 mPa*s), 566 g of a 30% strength by weight aqueous sodium vinylsulfonate solution and 33 g of a 1% strength by weight aqueous solution of $FeII(SO_4) \times 7H_2O$.

The pH of the solution was 7.2. The apparatus was freed from atmospheric oxygen, and 335 g of ethylene were forced into the apparatus and the ethylene feed was closed. At room temperature, 30% of monomer mixture B and 2.63 g of Brüggolit E01, dissolved in 194 g of water, was metered in. Heating was effected to an internal temperature of 60° C. and a solution of 3.75 g of 70% strength aqueous tert-butyl hydroperoxide solution in 194 g of water was metered in at 50° C. Cooling was effected to remove the heat of reaction. On reaching 60° C., 70% of monomer mixture B was metered in 90 minutes and 26.6 g of Brüggolit E01, dissolved in 1964 g of water, were metered in the course of 360 minutes and a solution of 38 g of 70% strength aqueous tert-butyl hydroperoxide solution in 1964 g of water in the course of 360 minutes. After the end of the metering of monomer mixture B, the monomer mixture A was metered in 270 minutes and the internal pressure of the vessel was increased to 40 bar by opening the ethylene feed, the ethylene feed remaining open at this pressure until a further 3020 g of ethylene had been metered in. After the end of the metering of monomer mixture A, a solution of 33.6 g of sodium persulfate in 792 g of water was metered in and the internal temperature increased to 80° C. and kept at this temperature for 1 hour. Thereafter, the major part of the unconverted ethylene was expelled in gaseous form with stirring and 2 l of water were added. 2 l of water were then distilled off in the course of 2 hours with application of a vacuum, with the result that the residual vinyl acetate content of the dispersion was reduced to 0.05% by weight, based on the dispersion.

Examples 3 to 7 and Comparative example C2 were produced according to this general working method. Details of the composition of the dispersions of Examples C2 and 3-7 are shown in Table 1 below.

TABLE 1

| | Monomer mixture B | Monomer mixture A |
|---|---|---|
| Comparative example 2 | 9815 g of vinyl acetate | 20 385 g of vinyl acetate |
| Example 3 | 9772 g of vinyl acetate and 43.6 g of vinyltrimethoxysilane | 20 295 g of vinyl acetate and 90.6 g of vinyltrimethoxysilane |
| Example 4 | 9681 g of vinyl acetate and 134.2 g of vinyltrimethoxysilane | 20 385 g of vinyl acetate |
| Example 5 | 9815 g of vinyl acetate | 20 251 g of vinyl acetate and 134.2 g of vinyltrimethoxysilane |
| Example 6 | 9717 g of vinyl acetate and 98.1 g of vinyltrimethoxysilane | 20 181 g of vinyl acetate and 203.9 g of vinyltrimethoxysilane |
| Example 7 | 9793 g of vinyl acetate and 21.8 g of vinyltrimethoxysilane | 20 340 g of vinyl acetate and 45.3 g of vinyltrimethoxysilane |

USE EXAMPLES

The invention is characterized in more detail below by formulation of emulsion paints or emulsion finishes having compositions shown in Tables 2, 4 and 6 below:

TABLE 2

Emulsion paint having a PVC of 77%

| Constituents | Parts by weight |
|---|---|
| Water | 301.5 |
| Dispersant (sodium polyphosphate, 10% strength solution) | 5.0 |
| Cellulose ether (type MH, high-viscosity) | 4.0 |
| Dispersant, Na salt of a polyacrylic acid | 3.5 |
| Antifoam based on mineral oil | 2.0 |
| 10% strength sodium hydroxide solution | 2.0 |
| Pigment, titanium dioxide | 80.0 |
| Filler, calcium carbonate, particle size 2 μm | 235.0 |
| Filler, calcium carbonate particle size 5 μm | 205.0 |
| Filler, aluminum silicate | 35.0 |
| Copolymer dispersion[1] | 125.0 |
| Preservative | 2.0 |

[1]The copolymers of Examples 2 to 7 were used (cf. Table 1)

The pulverulent methylhydroxyethylcellulose was sprinkled into the water and dissolved with stirring, after which the solutions of the NA salt of polyacrylic acid and polyphosphoric acid and the 10% strength by weight sodium hydroxide solution were added with stirring. The preservative and the antifoam were added to the viscous solution obtained. First aluminum silicate was dispersed with stirring by means of a dissolver at a stirring speed of 2000 rpm and then titanium dioxide and the calcium carbonate types were added, with stirring speed being increased to 5000 rpm. Dispersing was effected for a further 20 minutes at 5000 rpm, the temperature of the pigment/filler paste increasing to 60° C. Cooling was allowed to take place to 30° C. The pH was 9.3.

In order to investigate the parameters of the copolymer dispersions described, in each case 875 g of the pigment/filler paste was stirred with 125 g of the copolymer dispersion to be tested in each case (Lenard stirrer for 3 minutes at 1500 rpm). Emulsion paints having a solids content of about 63% and having a pigment volume concentration (PVC) of about 77% were obtained.

The wet scrub resistance (WSR) of these paints was tested by means of the nonwoven pad method (ISO 11998). For this purpose, the wear of the coating after storage for 28 days (28 d) was determined from the loss of mass of the paint film. The paint wear in μm was then calculated from the paint density, the surface areas scrubbed and the loss of mass of the paint film.

The key characteristic of the different emulsion paints is the scrub resistance (WSR). The test results are shown in Table 3.

TABLE 3

| | WSR [μm] |
|---|---|
| Comparative example 2 (without silane) | 75 |
| Example 3 | 50 |
| Example 4 | 53 |
| Example 5 | 40 |
| Example 6 | 36 |
| Example 7 | 54 |

TABLE 4

Emulsion paint having a PVC of 54.7%

| Constituents | Parts by weight |
|---|---|
| Water | 285.6 |
| Cellulose ether (type MH, high-viscosity) | 2.7 |
| Dispersant, Na salt of a polyacrylic acid | 5.4 |
| Antifoam based on mineral oil | 5.4 |
| 10% strength sodium hydroxide solution | 2.7 |
| Pigment, titanium dioxide | 271.5 |
| Filler, calcium carbonate particle size 1 μm | 203.7 |
| Copolymer dispersion[1] | 200.0 |
| PU thickener 20% strength solution | 20.4 |
| Preservative | 2.7 |

[1]The copolymers of Examples 2 to 7 were used (cf. Table 1)

The pulverulent methylhydroxyethylcellulose was sprinkled into the water and dissolved with stirring, after which the solution of the Na salt of polyacrylic acid and the 10% strength sodium hydroxide solution were added with stirring. The preservative and the antifoam were added to the viscous solution obtained. Titanium dioxide and the calcium carbonate were added with stirring by means of a dissolver at a stirring speed of 5000 rpm. Dispersing was effected for a further 20 minutes at 5000 rpm, the temperature of the pigment/filler paste increasing to 60° C. Cooling was allowed to take place to 30° C. The pH was 9.3.

In order to investigate the parameters of the copolymer dispersions described, in each case 800 g of the pigment/filler paste were stirred with 200 g of the copolymer dispersion to be tested in each case (Lenard stirrer for 3 minutes at 1500 rpm). Emulsion paints having a pigment volume concentration (PVC) of about 55% were obtained.

The wet scrub resistance (WSR) of these paints was tested by means of the nonwoven pad method (ISO 11998). For this purpose, the wear of the coating after storage for 28 days (28 d) was determined from the loss of mass of the paint film. The paint wear in μm was then calculated from the paint density, the surface areas scrubbed and the loss of mass of the paint film.

The key characteristic of the different emulsion paints is the scrub resistance (WSR). The test results are shown in Table 5.

TABLE 5

|  | WSR [μm] |
|---|---|
| Comparative example 2 (without silane) | 33 |
| Example 3 | 28 |
| Example 4 | 30 |
| Example 5 | 25 |
| Example 6 | 22 |
| Example 7 | 30 |

TABLE 6

Emulsion paint having a PVC of 38%

| Constituents | Parts by weight |
|---|---|
| Water | 214.2 |
| Cellulose ether (type MH, high-viscosity) | 2.0 |
| Dispersant, Na salt or a polyacrylic acid | 4.0 |
| Antifoam based on mineral oil | 4.0 |
| 10% strength sodium hydroxide solution | 2.0 |
| Pigment, titanium dioxide | 203.6 |
| Filler, calcium carbonate particle size 1 μm | 152.7 |
| Copolymer dispersion[1) | 400.0 |
| PU thickener 20% strength solution | 15.3 |
| Preservative | 2.0 |

[1)]The copolymers of Examples 2 to 7 were used (cf. Table 1)

The pulverulent methylhydroxyethylcellulose was sprinkled into the water and dissolved with stirring, after which the solution of the Na salt of polyacrylic acid and the 10% strength sodium hydroxide solution were added with stirring. The preservative and the antifoam were added to the viscous solution obtained. Titanium dioxide and the calcium carbonate were added with stirring by means of a dissolver at a stirring speed of 5000 rpm. Dispersing was effected for a further 20 minutes at 5000 rpm, the temperature of the pigment/filler paste increasing to 60° C. Cooling was allowed to take place to 30° C. The pH was 9.3.

In order to investigate the parameters of the copolymer dispersions described, in each case 600 g of the pigment/filler paste were stirred with 400 g of the copolymer dispersion to be tested in each case (Lenard stirrer for 3 minutes at 1500 rpm). Emulsion paints having a pigment volume concentration (PVC) of about 37.7% were obtained.

The wet scrub resistance (WSR) of these paints was tested by means of the nonwoven pad method (ISO 11998). For this purpose, the wear of the coating after storage for 28 days (28 d) was determined from the loss of mass of the paint film. The paint wear in μm was then calculated from the paint density, the surface areas scrubbed and the loss of mass of the paint film.

For testing the blocking resistance of the paint formulation having a PVC of 38%, microscope slides were coated with the corresponding emulsion finishes using a knifecoater with a nib of 200 μm. After drying for 24 hours under standard climatic conditions (23° C., 50% relative humidity), two coated microscope slides were placed with their coated side one on top of the other and loaded with 1 kg for 1 hour at room temperature. The weight required for separating the coated slides from one another again was then determined.

The key characteristics of the different emulsion paints are the scrub resistance (WSR) and the blocking resistance. The test results are shown in Table 7.

TABLE 7

|  | WSR [μm] | Blocking resistance g/6.25 cm$^2$ |
|---|---|---|
| Comparative example 1 | 7 | 2000 |
| Comparative example 2 (without silane) | 8 | 830 |
| Example 3 | 6 | 600 |
| Example 4 | 7 | 660 |
| Example 5 | 5 | 550 |
| Example 6 | 4 | 500 |
| Example 7 | 7 | 690 |

The measured values of the wet scrub resistance of the emulsion paints produced using a dispersion according to the invention (Example 5) clearly show that a substantial improvement in the WSR can be achieved in comparison with emulsion paints produced using a dispersion having a homogeneous silane distribution in the copolymer (Example 3). In addition, these emulsion paints are distinguished by a substantial improvement in the blocking resistances in comparison with an emulsion paint produced using dispersion not according to the invention, according to Comparative example 1, and having a PVC of 38%.

The invention claimed is:

1. An aqueous plastic dispersion based on a vinyl ester copolymer having a solids content of up to 80% by weight and a minimum film formation temperature below 20° C., the vinyl ester copolymer being characterized by the following features:

it is a multistage polymer and is derived from at least one homo- or copolymer A and at least one homo- or copolymer B, the copolymer A is derived from a monomer composition A which would give a copolymer having a glass transition temperature in the range from 0 to 20° C., the homo- or copolymer B is derived from a monomer composition B which would give a homo- or copolymer having a glass transition temperature in the range from 20 to 50° C., monomer compositions A and B which give polymers A and B whose glass transition temperatures differ by at least 10 K are used, the sum of the proportions of the polymers A and B in the vinyl ester copolymer are at least 50% by weight, based on the vinyl ester copolymer, the weight ratio of monomer composition A to monomer composition B is in the range from 95/5 to 5/95, the monomer composition A contains from 50 to 100% by weight of at least one vinyl ester of carboxylic acids having 1 to 18 carbon atoms (M1), based on the total mass of the monomers used in monomer composition A, the monomer composition B contains from 50 to 100% by weight of at least one vinyl ester of carboxylic acids having 1 to 18 carbon atoms (M1), based on the total mass of the monomers used in monomer composition B, at least one of the monomer compositions A or B contains from 0.05 to 10% by weight of at least one unsaturated, copolymerizable organosilicon compound (M4), based on the total mass of the monomers used in this monomer composition, the vinyl ester copolymer contains, based on the total mass of the monomers used for the preparation of the vinyl ester copolymer, from 0 to 3% by weight of structural units derived from at least one ethylenically unsaturated, ionic monomer (M3), the vinyl ester copolymer contains, based on the total mass of the monomers used for the preparation of the vinyl ester copolymer, from 0 to 10% by weight of structural units derived from at least one ethylenically unsaturated, nonionic monomer (M5), the aqueous plastic dispersion contains from 0 to 3% by weight, based on the total mass of the monomers used for the preparation of the vinyl ester copolymer, of ionic emulsifiers (S1), the aqueous plastic dispersion contains at least 0.5% by weight, based on the total mass of the monomers used for the preparation of the vinyl ester copolymer, of nonionic emulsifiers (S2), and wherein the ratio of the total mass of ionic components (M3) and (S1) to the total mass of nonionic components (M5) and (S2) used assumes a value of from 0.0 to 0.9.

2. The plastic dispersion as claimed in claim 1, which has a solids content which is in the range from 20 to 80% by weight.

3. The plastic dispersion as claimed in claim 1, wherein the sum of the proportions of the homo- or copolymers A and B in the vinyl ester copolymer is from 75 to 100% by weight, based on the total mass of the copolymer.

4. The plastic dispersion as claimed in claim 1, which has a pH in the range from 2 to 9.

5. The plastic dispersion as claimed in claim 1, wherein the homo- or copolymers A and/or B contain, as vinyl esters of carboxylic acids having 1 to 18 carbon atoms (M1), vinyl esters of carboxylic acids having 1 to 8 carbon atoms, vinyl esters of saturated, branched monocarboxylic acids having 9, 10 or 11 carbon atoms in the acid radical, vinyl esters of saturated or unsaturated fatty acids, vinyl esters of benzoic acid or of p-tert-butyl benzoic acid and mixtures thereof incorporated in the form of polymerized units.

6. The plastic dispersion as claimed in claim 1, wherein the homo- or copolymers A and/or B contain vinyl acetate incorporated in the form of polymerized units as vinyl esters of carboxylic acids having 1 to 18 carbon atoms (M1).

7. The plastic dispersion as claimed in claim 1, wherein the copolymers A and/or B contain monoethylenically unsaturated and optionally halogenated hydrocarbons having 2 to 4 carbon atoms (M2) incorporated in the form of copolymerized units.

8. The plastic dispersion as claimed in claim 7, wherein the proportion of monoethylenically unsaturated hydrocarbons having 2 to 4 carbon atoms (M2) in the vinyl ester copolymer, based on the total mass of the monomers used for the preparation of the vinyl ester copolymer, is less than 20% by weight.

9. The plastic dispersion as claimed in claim 1, wherein the homo- or copolymers A and/or B contain, as ethylenically unsaturated, ionic monomers (M3), unsaturated monocarboxylic acids, unsaturated dicarboxylic acids or monoesters thereof with alkanols, unsaturated sulfonic acids and/or unsaturated phosphonic acids incorporated in the form of copolymerized units.

10. The plastic dispersion as claimed in claim 1, wherein the copolymers derived from monomer composition A or the copolymers derived from monomer compositions A and B contain up to 10% by weight, based on the total mass of the monomers used in the monomer composition, structural units derived from at least one unsaturated, copolymerizable organosilicon compound (M4).

11. The plastic dispersion as claimed in claim 10, wherein the copolymers derived from monomer composition A or the copolymers derived from monomer compositions A and B contain from 0.1 to 1.5% by weight, based on the total mass of the respective monomer composition, of structural units derived from at least one unsaturated, copolymerizable organosilicon compound (M4).

12. The plastic dispersion as claimed in claim 1, wherein monomers containing siloxane groups and of the formula $RSi(CH_3)_{0-2}(OR^1)_{3-1}$ are used as unsaturated, copolymerizable organosilicon compounds (M4), R having the meaning $CH_2=CR^2-(CH_2)_{0-1}$ or $CH_2=CR^2-CO_2-(CH_2)_{1-3}$, $R^1$ being a straight-chain or branched, optionally substituted alkyl radical having 1 to 12 carbon atoms which may optionally be interrupted by an ether group, and $R^2$ being H or $CH_3$.

13. The plastic dispersion as claimed in claim 1, wherein the vinyl ester copolymer contains up to 30% by weight of at least one further, ethylenically unsaturated monomer (M6), based on the total mass of the monomers used for the preparation of the vinyl ester copolymer, incorporated in the form of copolymerized units.

14. The plastic dispersion as claimed in claim 1, which contains anionic emulsifiers as ionic emulsifiers (S1).

15. The plastic dispersion as claimed in claim 14, which contains as anionic emulsifiers, alkali metal and ammonium salts of alkylsulfates, alkylphosphonates, sulfuric acid monoesters or phosphoric acid mono- or diesters of ethoxylated alkanols and of ethoxylated alkylphenols, of alkanesulfonic acids and alkylarylsulfonic acids, and/or compounds of the formula 1

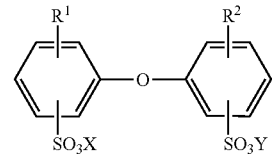

in which $R^1$ and $R^2$ are hydrogen or $C_4$-$C_{24}$-alkyl and are not simultaneously hydrogen, and X and Y are alkali metal ions and/or ammonium ions.

16. The plastic dispersion as claimed in claim 1, which contains, based on the total mass of the monomers used for the preparation of the vinyl ester copolymer, from 1 to 8% by weight of nonionic emulsifiers (S2).

17. The plastic dispersion as claimed in claim 1, which contains, as nonionic emulsifiers (S2), araliphatic and aliphatic nonionic emulsifiers.

18. The plastic dispersion as claimed in claim 17, which contains, as nonionic emulsifiers (S2), ethoxylates of branched or straight-chain alkanols (alkyl radical: $C_6$ to $C_{22}$, average degree of ethoxylation: from 3 to 50), ethoxylates based on natural alcohols, Guerbet alcohols or oxo alcohols having a linear or branched $C_{12}$-$C_{18}$-alkyl radical and a degree of ethoxylation 10 of from 8 to 50.

19. The plastic dispersion as claimed in claim 1, which contain protective colloids.

20. The plastic dispersion as claimed in claim 19, which contain polyvinyl alcohols.

21. A method for producing a plastic dispersion as claimed in claim 1, wherein a homo- or copolymer B is first prepared by aqueous, free radical emulsion polymerization of a monomer or of a monomer mixture B and then the homo- or copolymer A is prepared in the aqueous dispersion of the homo- or copolymer B by free radical emulsion polymerization of a monomer or of a monomer mixture A, the free radical emulsion polymerization being carried out in the presence of nonionic emulsifiers (S2) and optionally in the presence of ethylenically unsaturated, ionic monomers (M3) and/or ionic emulsifiers (S1) so that the total mass of the nonionic emulsifiers (S2) in the end product is at least 0.5% by weight, based on the total mass of the monomers used for the preparation of the vinyl ester copolymer, and wherein the ratio of the total mass of ionic components (M3) and (S1) to the total mass of nonionic components (M5) and (S2) used assumes a value of from 0.0 to 0.9.

22. The method as claimed in claim 21, wherein the free radical emulsion polymerization is effected in the presence of protective colloids.

23. The method as claimed in claim 21, wherein the free radical emulsion polymerization is effected in the presence of substances regulating the molecular weight.

24. An aqueous preparation for coating substrates, containing a plastic dispersion as claimed in claim 1.

25. A pigment-containing, aqueous preparation containing a plastic dispersion as claimed in claim 1.

26. An emulsion paint containing a plastic dispersion as claimed in claim 1.

27. A food coating containing a plastic dispersion as claimed in claim 1.

28. A papercoating slip containing a plastic dispersion as claimed in claim 1.

29. The plastic dispersion as claimed in claim 7, wherein the monoethylenically unsaturated hydrocarbon is ethene.

30. A method for producing a plastic dispersion as claimed in claim 1, wherein a homo- or copolymer A is first prepared by aqueous, free radical emulsion polymerization of a monomer or of a monomer mixture A and then the homo- or copolymer B is prepared in the aqueous dispersion of the homo- or copolymer A by free radical emulsion polymerization of a monomer or of a monomer mixture B, the free radical emulsion polymerization being carried out in the presence of nonionic emulsifiers (S2) and optionally in the presence of ethylenically unsaturated, ionic monomers (M3) and/or ionic emulsifiers (S1) so that the total mass of the nonionic emulsifiers (S2) in the end product is at least 0.5% by weight, based on the total mass of the monomers used for the preparation of the vinyl ester copolymer, and wherein the ratio of the total mass of ionic components (M3) and (S1) to the total mass of nonionic components (M5) and (S2) used assumes a value of from 0.0 to 0.9.

* * * * *